Figure 1:
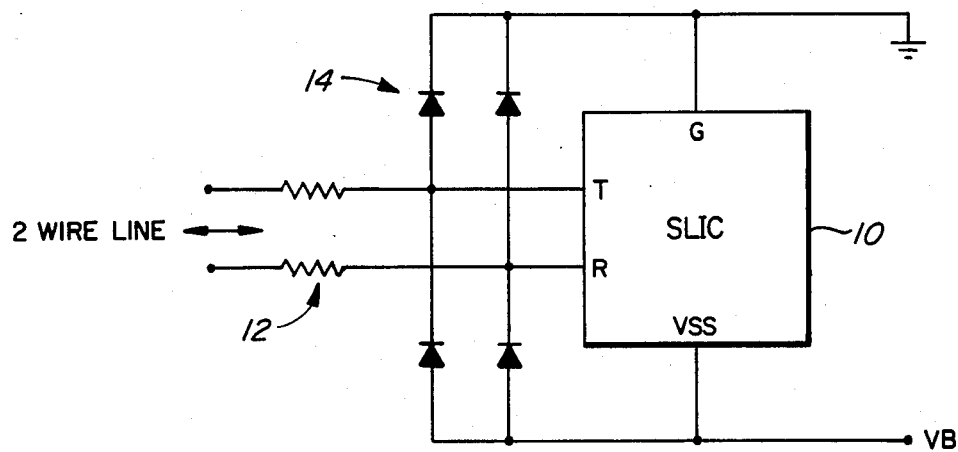

United States Patent [19]

Jakab

[11] Patent Number: 4,661,979
[45] Date of Patent: Apr. 28, 1987

[54] FAULT PROTECTION FOR INTEGRATED SUBSCRIBER LINE INTERFACE CIRCUITS

[75] Inventor: Gyula Jakab, Nepean, Canada

[73] Assignee: Northern Telecom Limited, Montreal, Canada

[21] Appl. No.: 779,560

[22] Filed: Sep. 24, 1985

[51] Int. Cl.$^4$ .......................... H04M 7/00; H03K 3/26
[52] U.S. Cl. ...................................... 379/412; 307/565; 307/318; 361/119; 361/91
[58] Field of Search ........... 179/16 AA, 16 F, 18 FA, 179/81 R, 170 NC, 170 R, 70, 77, 27 G, 186; 361/119, 118, 111, 110, 91; 307/318, 540, 350, 565, 566, 296 R; 357/40, 41; 379/412, 399

[56] References Cited

U.S. PATENT DOCUMENTS

| | | | |
|---|---|---|---|
| 4,088,843 | 3/1978 | Rogers et al. | 179/70 |
| 4,114,089 | 9/1978 | Ahmed | 324/51 |
| 4,264,787 | 4/1981 | Yachabach et al. | 179/81 R |
| 4,278,847 | 7/1981 | Wortman | 179/170 NC |
| 4,300,023 | 11/1981 | Kelley et al. | 179/170 NC |
| 4,467,310 | 8/1984 | Jakab | 338/22 R |
| 4,473,758 | 9/1984 | Huntington | 307/296 R |
| 4,578,695 | 3/1986 | Delaporte et al. | 357/48 |
| 4,585,905 | 4/1986 | Brown | 379/412 |

*Primary Examiner*—Gene Z. Rubinson
*Assistant Examiner*—R. Vaas
*Attorney, Agent, or Firm*—R. John Haley

[57] ABSTRACT

An integrated SLIC having input pins coupled to the wires of a two-wire telephone subscriber line is protected from excessive voltages on the line by reverse biassed 60 volt zener diodes connected between each input pin and ground, normally reverse biassed diodes within the integrated circuit connected between each input pin and the substrate of the integrated circuit, and a normally forward biassed diode connected between the substrate and a −48 volt (nominal) supply voltage.

7 Claims, 2 Drawing Figures

FAULT PROTECTION FOR INTEGRATED SUBSCRIBER LINE INTERFACE CIRCUITS

This invention relates to fault protection arrangements for protecting integrated circuits, in particular integrated subscriber line interface circuits (SLICs), against excessive voltages.

Many proposals exist for integrated SLICs, or hybrid circuits, which provide for transformerless coupling of a two-wire telephone subscriber line to the integrated circuit. A major problem associated with such coupling is that the subscriber line is subject to excessive voltages and currents due for example to lightning or accidental connections to power lines, and these will damage the integrated circuit if they are applied to it. Accordingly, it is necessary to provide protection for the integrated circuit against the results of such faults.

One known form of such protection, described for example in Kelley et al. U.S. Pat. No. 4,300,023 issued Nov. 10, 1981, comprises a diode bridge via which the two subscriber line inputs of the integrated circuit are connected to the supply voltages (ground and −48 volts) for the integrated circuit. In such an arrangement, an excessive voltage on either subscriber line wire results in one of the diodes of the bridge becoming forward biassed to clamp the respective input of the integrated circuit to substantially the respective supply voltage.

Whilst this known arrangement is effective for protection against positive excessive voltages because of the clamping to ground, it is impractical for negative excessive voltages exceeding the −48 volt supply voltage, which is generally derived from a fused battery line supplying many circuits, because the fault may then cause the fuse to blow, or make the battery line more negative with consequent damage to circuits connected thereto, or result in overcharging of the battery.

An object of this invention, therefore, is to provide an improved fault protection arrangement for protecting an integrated circuit.

According to this invention there is provided a fault protection arrangement for protecting an integrated circuit which includes a substrate for connection to a supply voltage, comprising a normally reverse biassed zener diode connected between an input pin of the integrated circuit and a point of reference potential, a normally forward biassed diode via which the supply voltage is connected to the substrate, and a normally reverse biassed diode connected between the substrate and the input pin, the arrangement being such that the zener diode clamps the voltage at the input pin at a predetermined voltage which is not less than the supply voltage.

The normally reverse biassed diode is conveniently part of the integrated circuit, and may comprise a physical diode or a diode junction between the substrate and a transistor electrode which is coupled to the input pin. The normally forward biassed diode may also be part of the integrated circuit.

In a preferred embodiment of the invention, the integrated circuit comprises a telephone subscriber line interface circuit having a p-type semiconductor substrate for connection to a negative supply voltage, the reference potential is substantially ground potential, and the zener diode has a zener voltage which is greater than the negative supply voltage. In such an arrangement typically the negative supply voltage is nominally −48 volts and the zener voltage is about 60 volts.

The invention also provides a telephone subscriber line interface circuit comprising an integrated circuit, having two input pins for transformerless coupling to the wires of a two-wire telephone subscriber line, and a fault protection arrangement as recited above for each of said input pins.

The invention will be further understood from the following description with reference to the accompanying drawings, in which:

FIG. 1 schematically illustrates a known protection arrangement; and

Figure 2:
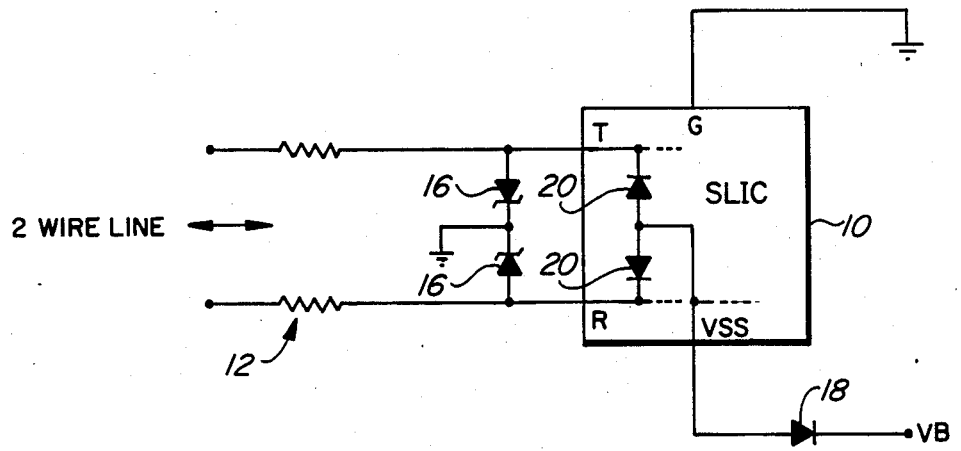

FIG. 2 schematically illustrates a protection arrangement in accordance with an embodiment of the invention.

Referring to FIG. 1, a known form of protection arrangement for an integrated subscriber line interface circuit (SLIC) 10 or hybrid circuit is illustrated, the drawing only showing those parts which are relevant to the protection arrangement. As illustrated, the SLIC 10 has supply voltage terminals G and VSS which are connected to ground and a negative supply voltage VB respectively. The voltage VB is typically a telephone central office battery line voltage which is nominally −48 volts but which may vary from −44 volts to −56 volts.

Tip and ring inputs T and R respectively of the SLIC 10 are coupled via resistors 12 to the respective wires of a two-wire telephone subscriber line. The resistors 12 are closely matched, and may for example each comprise a series-connected thick-film resistor and switching-type PTC resistor as described and claimed in Jakab U.S. Pat. No. 4,467,310 issued Aug. 21, 1984. The inputs T and R are also coupled to the supply voltage lines via a diode bridge 14 whose four diodes are reverse biassed in normal operation.

In the event of a fault producing a positive voltage, or a negative voltage exceeding VB, on either of the wires of the subscriber line, one of the diodes of the bridge 14 becomes forward biassed to clamp the voltage at the respective input T or R of the SLIC 10 to substantially the supply voltage. As already explained, an excessive negative voltage can adversely affect the battery line voltage VB.

FIG. 2, in which the same references as in FIG. 1 are used to denote similar components, illustrates a protection arrangement in accordance with an embodiment of the invention, in which this disadvantage of the prior art arrangement is avoided.

Referring to FIG. 2, the diode bridge 14 of FIG. 1 is dispensed with, and zener diodes 16 are connected between the inputs T and R of the SLIC 10 and ground. Each zener diode 16 is poled to be forward biassed by a positive voltage applied to the respective wire of the subscriber line, whereby clamping of the inputs T and R to substantially ground potential (0.6 volts) is effected in the same manner as in the arrangement of FIG. 1. Each zener diode 16 has a zener voltage, at which it becomes conductive when reverse biassed, of for example 60 volts, this being selected to be a little greater than the maximum battery line voltage VB of −56 volts.

In addition to the zener diodes 16, the arrangement of FIG. 2 includes a diode 18 via which the supply voltage terminal VSS of the SLIC 10, which terminal is connected to the p-type semiconductor substrate of the integrated circuit, is connected to the negative battery voltage VB. The diode 18 is poled to be forward biassed in normal operation. Furthermore, the arrangement of FIG. 2 includes diodes 20 each connected between a respective one of the inputs T and R to be protected and the substrate and poled to be reverse biassed in normal operation.

Thus in normal operation, when the voltages present on the wires of the subscriber line are between the supply voltages of 0 volts and VB, the zener diodes 16 and the diodes 20 have no effect, and the only effect of the diode 18 is to produce a small forward voltage drop which is of no consequence.

Now if an excessive negative voltage is applied to one of the wires of the subscriber line, causing the respective input T or R to become more negative than the battery line voltage VB, then the respective diode 20 becomes forward biassed and the diode 18 becomes reverse biassed. In consequence, the battery line voltage is isolated, by the reverse biassed diode 18, from the excessive input voltage, so that the disadvantages of the arrangement of FIG. 1 are avoided. In addition, the negative supply voltage to the substrate of the integrated circuit, normally supplied via the terminal VSS, is now supplied via the relevant input terminal T and R and diode 20. Thus the relevant input terminal T or R can not become more negative than the substrate by more than the forward voltage drop across the relevant diode 20. The relevant zener diode 16 clamps the negative voltage at the input terminal T or R so that it can not exceed −60 volts, so that an excessive negative voltage is not applied to either of these inputs or, via these inputs and the diodes 20, to the integrated circuit substrate.

From the above description it should be appreciated that the presence of the diode 18 enables the substrate of the integrated circuit SLIC 10 to become more negative than the battery line voltage VB, this thereby being isolated from excessive voltages arising as a result of faults. This voltage VB is also able to vary within a typical range from −44 volts to −56 volts without adversely affecting the operation of the protection arrangement. The presence of the diodes 20 enables the substrate voltage to follow an excessive negative voltage applied to the respective input T or R whereby an excessive and damaging voltage difference between an input and the substrate is avoided. The zener diodes 16 clamp excessive negative voltages to −60 volts so that negative voltages greater than this are not applied to the integrated circuit, and also clamp positive voltages to the forward voltage drop of these diodes.

The diodes 20 are shown as being within the SLIC integrated circuit, this being a preferred and convenient arrangement. In this case each diode 20 is preferably formed as a physical diode in the integrated circuit, designed in known manner to carry the maximum current which can be drawn by the integrated circuit. Alternatively, or in addition, each diode 20 can be constituted by a diode junction which already may exist in the integrated circuit, for example between the p-type substrate and the n+-type collector of a bipolar transistor which is connected to the relevant input T or R.

As a further alternative, each diode 20 can be a discrete diode connected outside the SLIC 10 between the respective input T or R and the substrate terminal VSS. Conversely, the diode 18 can be formed as a diode within the SLIC 10 integrated circuit rather than being separate from it as illustrated.

Numerous other modifications, variations, and adaptations may be made to the particular embodiment of the invention described above without departing from the scope of the invention as defined in the claims.

What is claimed is:

1. An integrated circuit fault protection arrangement comprising an integrated circuit which includes an input and a substrate, a zener diode connected between the input and a point of reference potential, a first diode connected to the substrate for coupling a supply voltage thereto, and a second diode connected between the substrate and the input; the zener diode, first diode, and second diode being arranged to be respectively reverse biassed, forward biassed, and reverse biassed in normal operation, the arrangement being such that the zener diode clamps voltages at the input at a predetermined voltage which is not less than the supply voltage.

2. An arrangement as claimed in claim 1 wherein the second diode is integrated with the integrated circuit.

3. An arrangement as claimed in claim 2 wherein the integrated circuit includes a transistor electrode which is coupled to the input, and the second diode is constituted by a diode junction between the substrate and the transistor electrode.

4. An arrangement as claimed in claim 1 wherein the first diode is integrated with the integrated circuit.

5. An arrangement as claimed in claim 1 wherein the integrated circuit comprises a telephone subscriber line interface circuit having a p-type semiconductor substrate for connection to a negative supply voltage, the reference potential is ground potential, and the zener diode has a zener voltage which is greater than the negative supply voltage.

6. An arrangement as claimed in claim 5 wherein the negative supply voltage is nominally −48 volts and the zener voltage is about 60 volts.

7. A telephone subscriber line interface circuit comprising an integrated circuit including a substrate and two inputs for coupling to the wires of a two-wire telephone subscriber line, two zener diodes each connected between a respective one of the inputs and a ground point, a first diode connected to the substrate for coupling a supply voltage thereto, and two second diodes each connected between the substrate and a respective one of the inputs; the zener diodes, first diode, and second diodes being arranged to be respectively reverse biassed, forward biassed, and reverse biassed in normal operation, the arrangement being such that each zener diode clamps voltages at the input to which it is connected at a predetermined voltage which is not less than the supply voltage.

* * * * *